UNITED STATES PATENT OFFICE.

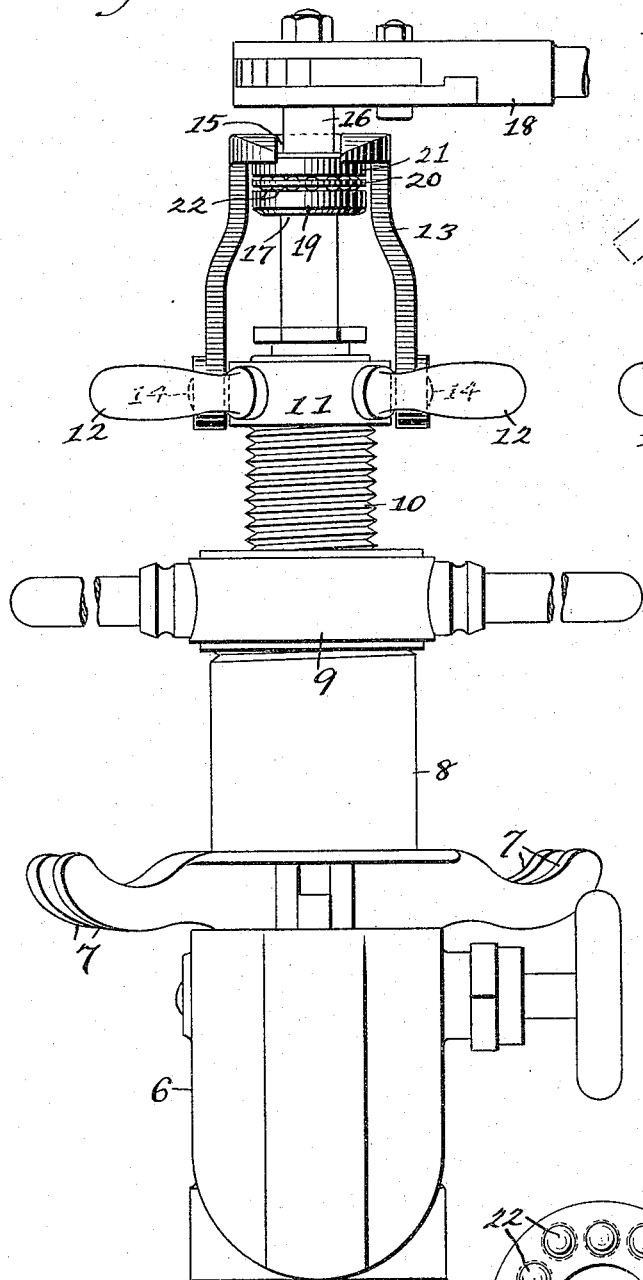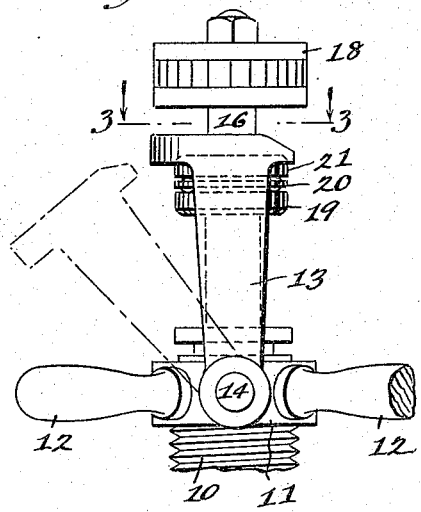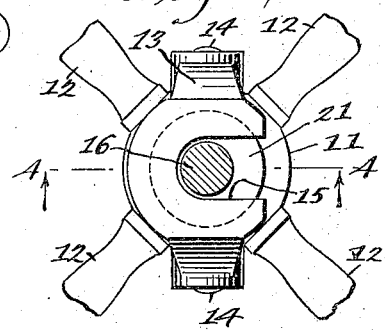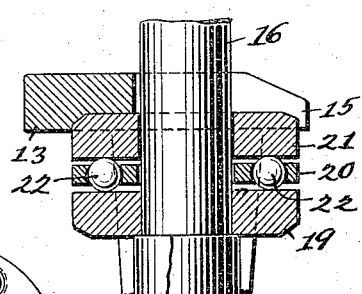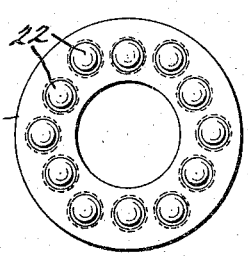

HARRY WEIMER ALCORN AND FREDERICK REED GRAVATT, OF BARBERTON, OHIO.

TAPPING-MACHINE.

1,168,143.   Specification of Letters Patent.   Patented Jan. 11, 1916.

Application filed March 27, 1915.   Serial No. 17,370.

*To all whom it may concern:*

Be it known that we, HARRY W. ALCORN and FREDERICK R. GRAVATT, citizens of the United States, and residents of Barberton, in the county of Summit and State of Ohio, have invented certain new and useful Improvements in Tapping-Machines, of which the following is a specification.

Our invention relates to pipe tapping machines, as in water, gas, oil, or other systems, and the main object thereof is to provide an attachment for conventional tapping machines which renders the tapping operation much easier and quicker than is now possible.

A further object is to provide such an attachment which obviates the wear of a portion of the conventional machines, thereby avoiding the necessity for frequent and costly replacement of the worn portion.

A further object is to provide such an attachment which may be applied to a conventional machine by merely slipping the same thereon; and further objects are to provide such attachments which are of a size enabling the same to be carried in the pocket of a workman, which are formed of separable parts permitting easy cleansing, which are well adapted to the purpose for which they are designed, and which are comparatively inexpensive.

Our invention is fully described in the following specification, of which the accompanying drawings form a part, in which like reference characters refer to like parts in each of the views, and in which:—

Figure 1 is a side elevation of a tapping machine provided with our invention, ready for use; Fig. 2 is a fragmentary elevation taken at right angles to Fig. 1; Fig. 3 is a section taken on the line 3—3 of Fig. 2; Fig. 4 is a section taken on the line 4—4 of Fig. 3; and Fig. 5 is a detached view of one of the elements of the invention.

In the drawings forming a part of this application we have shown a tapping machine comprising a saddle 6 provided with arms 7 for a chain, not shown, and having a cylinder 8 thereover with which is connected a cap 9 carrying the feed screw 10 and with which a feed-nut 11 is engaged. The feed-nut 11 is provided with actuating handles 12 and with a yoke 13 pivoted thereto at 14 and having a slot 15 in the top thereof, Fig. 3, the boring-bar 16 being passed downwardly through the feed screw 10 and being provided with the usual shoulder 17 and actuated by means of the ratchet-bar 18 in the usual manner or otherwise.

The boring-bar is kept in contact with the pipe being tapped, in present machines, by means of the feed-nut 11 which carries the yoke 13 and which yoke bears on a collar or washer resting upon the shoulder 17, the collar being steel and the yoke cast-iron, with the result that the yoke wears rapidly at its point of contact with the steel collar, thus requiring frequent substitution of the yoke 13 at considerable expense. Our invention is designed to overcome this defect in the present machines by the provision of anti-frictional means between said yoke and collar. These means comprise a collar 19 adapted to be slipped on the boring-bar and rest on the shoulder 17 thereof, after which a ball-carrying ring 20 is slipped down on the collar 19 and a supplemental collar 21 slipped down over said ring, the balls 22 being thus interposed between the collars 19 and 21 and being independently movable in an anti-frictional manner. The yoke 13 is then placed in position and the feed-nut 11 screwed downwardly on the feed screw 10 until said yoke bears on the upper collar 21. As the boring advances, the feed-nut is advanced, this causing the yoke to be revolved but, because of the anti-frictional balls 22, the frictional engagement between the yoke and collar 21, and between the collar 19 and the shoulder 17 is unaffected, and rotation of the boring-bar by means of the ratchet-bar 18 is rendered free and anti-frictionally, as is the revolution of the yoke 13 with respect to the boring-bar. We have shown the under side of the top of the yoke recessed in order to have the collar 21 seat itself therein, but this is not imperative; it does, however, avoid the possibility of the yoke slipping from the collar at any time, this being an advantage, as will be understood.

While we may, if desired, provide the attachment formed by the collars, ring, and balls, as a unit, we may also provide the same of separable elements as shown, the latter having the advantage of ready substitution if an element is damaged, and also allowing the separate elements to be carried in different pockets when not in use, thus not causing the entire weight and bulk thereof to be in one pocket. It will thus be seen that we not only provide against wear on the parts of the machine but, because of the ease of boring-bar actuation, we accelerate the boring operation, by enabling the boring-bar to be fed forwardly farther in each shift because of the relative ease of rotation thereof due to the absence of friction.

While we have shown a preferred form, it will be obvious that we are not limited thereto, as we may make changes thereover, within the scope of the following claim, without departing from the spirit of our invention, or sacrificing its advantages.

Having fully described our invention, what we claim as new, and desire to secure by Letters Patent, is:—

In a tapping machine provided with a boring-bar having a shoulder formed thereon, a feed screw, a feed-nut, and a yoke on said nut, adapted to straddle said boring-bar; a collar on said boring-bar resting on said shoulder, a supplemental collar upon which said yoke bears, and a ball-carrying ring interposed between said collars.

In testimony whereof we have signed our names to this specification in the presence of two subscribing witnesses.

HARRY WEIMER ALCORN.
FRED REED GRAVATT.

Witnesses:
GUY HENRY FERGUSON,
CHAS. BRYAN BYERS.

Copies of this patent may be obtained for five cents each, by addressing the "Commissioner of Patents, Washington, D. C."